Oct. 3, 1944. E. OGLE 2,359,668
SAW SETTING TOOL
Filed July 5, 1943 2 Sheets-Sheet 1
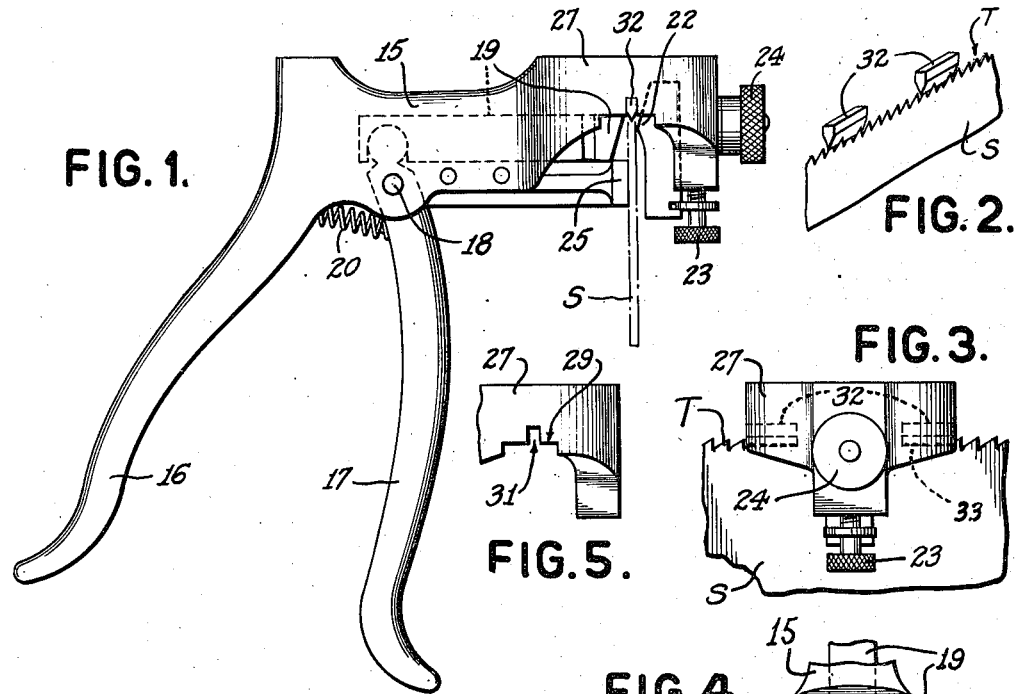
FIG. 1.
FIG. 2.
FIG. 3.
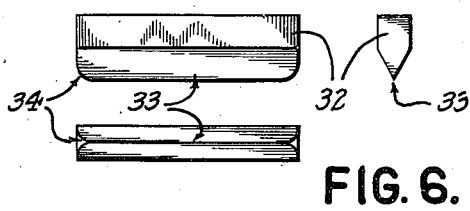
FIG. 5.
FIG. 4.
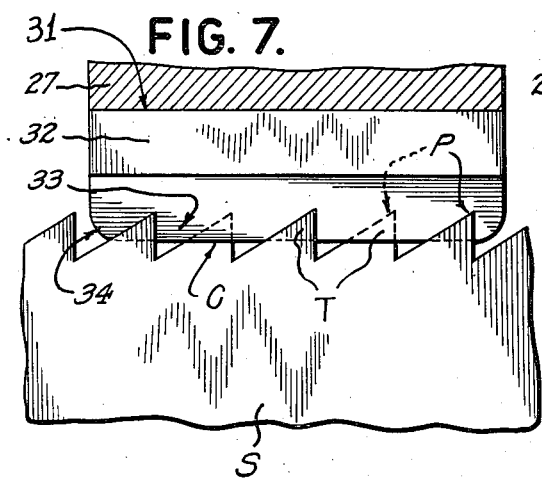
FIG. 6.
FIG. 7.
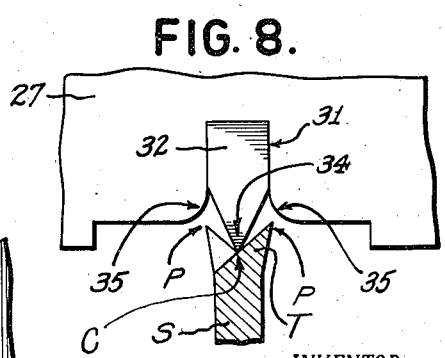
FIG. 8.
INVENTOR.
EDWARD OGLE
BY James C. Ledbetter
ATTORNEY Oct. 3, 1944.         E. OGLE         2,359,668
SAW SETTING TOOL
Filed July 5, 1943         2 Sheets-Sheet 2

INVENTOR.
EDWARD OGLE
BY
James C. Ledbetter
ATTORNEY

UNITED STATES PATENT OFFICE 2,359,668

SAW SETTING TOOL

Edward Ogle, Dallas, Tex.

Application July 5, 1943, Serial No. 493,571

13 Claims. (Cl. 76—69)

This invention relates to devices for setting saws and more particularly to a new saw setting tool so constructed and arranged as not only to render constant and long lasting the original accurate registry of the tool with the teeth of the saw but also to eliminate the tendency to dull the teeth during the setting operation in connection with reconditioning saws.

A dulled saw usually (in conventional practice) is first set, that is, its teeth are restored to their normal cutting angle, which is to say that the alternate teeth are deflected or reset angularly outwardly in opposite directions in bent relation to the plane of the saw blade, and thereafter the teeth are file-sharpened. The filing of the saw teeth is done after the setting operation in order, more importantly, to avoid the tendency to dull the previously sharpened teeth which dulling would occur in the use of conventional saw setting tools if such tool was applied to the teeth after the filing operation.

I have found it to be an advantage to reverse the operation and set the saw teeth last because it makes for increased uniformity of the reconditioned teeth. My invention makes the reversal possible inasmuch as my new saw setting tool does not engage or rest on the saw teeth points and consequently will not dull the previously sharpened teeth.

In conventional practice, as well as in the use of my new tool herein, the saw blade usually is held in a vertical position, with the teeth up, by a vise or clamp during the file-sharpening and setting operations (whichever sequence is adopted), and thus the operator may look down upon the row of teeth when working on them. As said before, I file the teeth first and set them last, since, in my new tool, the pre-sharpened teeth points do not come in contact with my tool.

A standard or present-day saw resetting tool is placed down upon the points of the saw teeth (directly in contact with their cutting points) and is operated by hand to offset or angularly adjust one tooth at a time. As well known in the art, this conventional operating position of a saw setting tool brings its metal frame into contact with several teeth points at a time, in order that the movable plunger and stationary anvil may act upon and set only one tooth at a time. The tool is moved along the saw blade, from one tooth to another, and from one end of the saw blade to the other end thereof. The saw blade is twice traversed by the setting tool, due to the need of skipping every other tooth each trip along the blade; hence each tooth, as well as the tool, is twice subjected to the dulling as well as the wearing tendency, respectively, during one saw setting operation.

Strangely enough, a saw which has become dull through use, and comes to the shop for resharpening, actually goes through another dulling operation (in conventional practice), by reason of the operative characteristics of all makes of saw sets, before the file-sharpening operation is reached.

The constant repetition of either sliding or lifting the conventional tool and replacing it down upon and in contact with the teeth points, for registering with exactness the anvil and plunger with the individual tooth to be off-set, not only causes wear and abrasion of the frame of the tool where it rests against the sharp points of the teeth, but likewise dulls the points. Seemingly, it is not practical to harden the frame or tooth rest portion or surface of conventional saw setting tools, by which to inhibit wear of the frame at the critical area thereof, since that would increase its dulling effect on the already dulled points of the teeth.

It is the point or extreme tip portion of a saw tooth which possesses maximum cutting capacity, yet it is the point or tip as such which is the most vulnerable portion and which twice is subjected to the weight and sliding action of the conventional tool tending to dull the points of the saw teeth in the course of one complete setting operation preliminary to filing the teeth to resharpen them.

The wearing away of the tool frame at its tooth rest, occasioned by tooth point abrasion, in time causes the tool to perform less accurately due to the fact that the worn tool rests deeper on the saw blade than for which originally intended, thereby resulting in the anvil and its coacting plunger taking a larger or deeper bite on the tooth than for which both the saw and tool were originally designed. This maladjustment due to tool wear not only results in inaccurately offsetting or bending the teeth to their proper angular set, but the weight of the setting tool as well as the weight or pressure of one's hand thereon, when moving it along the saw blade and also the operation of the tool handle, taken altogether, make for conditions tending to dull the points of the saw teeth and to wear away the tool frame.

This invention is believed to afford a solution of the problem by providing a non-wearing and non-dulling gauge or guide surface comprising a new form of rest carried by the tool frame. This gauging rest comprises means which seats against the non-cutting portions of the teeth (not on their points) and supports the tool frame in clearance relation and away from or out of contact with the previously sharpened points of the saw teeth in order that the teeth may not wear the frame by abrasion at its depth gauging rest. This new mode of operation simply means, first, that since the tool does not wear, it does not deepen or increase its bite on the teeth and, second, it does not dull the points. Thus, the invention serves these two purposes in attaining its new results, whether my new tool is used after (preferably) or before file-sharpening the teeth.

Accordingly, it is an object of the invention to produce a saw setting tool which rests or bears on the saw in a manner other than in engagement with the sharpened teeth points, in order to preserve both the points and the tool.

In connection therewith, an object is to improve upon saw sets in general by providing the frame thereof with constant-depth tooth-gauging means adapted to rest in between the sharpened saw teeth points to support the frame out of contact with the points, in order to avoid wear or abrasion of the frame, and moreover to prevent dulling of the points which are the most vulnerable cutting portions of saw teeth.

And a further object is to produce a saw setting tool, the frame of which has a tooth rest depth gauge which bears longitudinally along the blade, down in between its teeth points and against tooth portions of minimum cutting capacity for the purpose of positively supporting the tool out of contact with the points of the saw teeth.

Also, it is a purpose to produce a hardened steel or other hardened material as a tooth rest or depth gauge which lasts indefinitely and preserves the accuracy of the saw setting tool through a long period of usefulness.

Likewise, it is a purpose, in one form of the invention, to produce a hardened insert or tooth rest in pairs adapted to be mounted or built into the tool frame to rest between the saw teeth points to support the tool out of contact therewith.

Accordingly, the principle of this invention and its mode of operation begets a construction rendering practical a tempered or hardened-steel tooth rest or what may be called a tooth or teeth depth gauge which serves in a new manner the same purpose as in previously known saw setting tools, that is, it predetermines and gauges the depth or length of the bite taken on each tooth to be angularly set but does not rest dulling and wearing fashion on the teeth points whether file-sharpened before or after the setting tool is used. The weight of my tool bears against what I may call the crotch of the teeth which is of minimum cutting capacity.

The description herein and the accompanying drawings disclose the principle as well as an example or examples of the structural organization and mode of operation of the invention, in arrangements thereof preferred at this time, and suggest future modifications or equivalent forms as well as re-arrangements thereof to those who may avail themselves of the benefits of the invention.

The drawings show a standard tool converted to my new construction and render convenient a comparison thereof with the conventional tool and present day practice.

In the drawings, the initial eight views show the first form of the invention.

Fig. 1 shows a side view of a saw setting tool embodying this invention. A conventional tool is chosen for the illustration of my wholly new tool combination in respect to the tooth resetting features including the non-wearing and non-dulling tooth depth gauge means. The new tool is shown placed in position on a saw blade, indicated at S in dot-dash lines, disposed in a vertical position with the teeth pointing upwardly. The weight of the tool is not resting on the sharp points of the teeth, as in conventional practice.

Fig. 2 is a schematic perspective view of a pair of my new saw tooth rest members, constituting the new saw set depth gauge herein, the same being shown separately from the frame of the tool, disposed longitudinally along and between the points within the crotch of the teeth of a carpenter's saw.

Fig. 3 is a front view, and Fig. 4 a top view of the operating head of the tool. The tooth rest pair or depth gauging means is shown in dotted lines. A fragment of the saw, upon which the tool rests, is shown in full lines in both views.

Fig. 5 is a fragmentary side view of the tool head grooved at its conventional depth gauge surface to receive the pair of tooth rests or my new depth gauge members shown by dotted lines in Figs. 3 and 4.

Figs. 1 thru 5 are shown closely approximating the actual scale or size of the parts involved, whereas Figs. 6 thru 13 are enlarged diagrammatic views.

Fig. 6 is a group of three views (side, top and end elevations) of the tooth rest or depth gauge in one of its forms. One member is shown, but a pair thereof is used in constructing the frame of the new tool, as will be seen in dotted lines in Figs. 3 and 4, and also in the schematic perspective of Fig. 2.

Fig. 7 shows a side elevation of the teeth of a saw blade disposed longitudinally astride the tooth depth gauge of the tool when it is disposed in operating position down on the saw blade, by which to maintain the teeth points in spaced relation from the frame of the tool in accordance with this invention.

Fig. 8 is an end elevation of enlarged Fig. 7 and, to like effect, of the new depth gauge in Fig. 1 more nearly in actual size.

Figure 10:
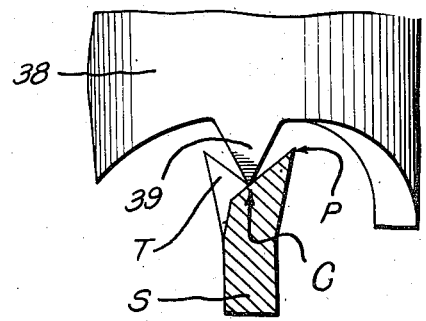

Fig. 10 further illustrates the principle of the invention by showing the tooth rest or depth gauge made integrally with the tool frame, as a third equivalent form.

Figure 11:
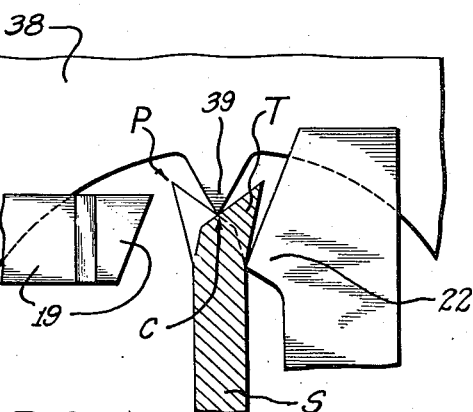
Figure 12:
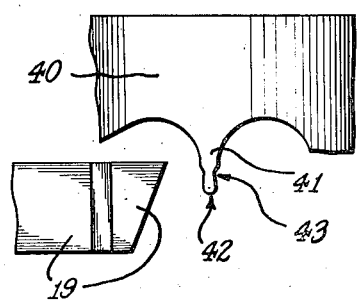

Figs. 11 and 12 illustrate the relation between the tooth depth gauge and the tool plunger, a feature common to all forms of the invention, the Fig. 10 construction being chosen to illustrate this relation.

Figure 13:
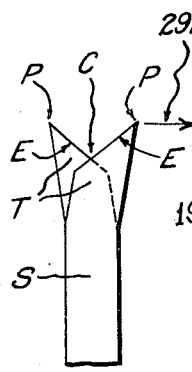

Fig. 13 is an end view of a saw blade and teeth on an enlarged scale. The saw teeth points are coincident with a dotted arrow line defining the plane of the tooth rest depth gauge of a conventional tool next shown.

The next three views are made to approximately actual size of a saw set and demonstrate the wearing tendency of the saw teeth against the frame of a conventional saw setting tool.

Figure 14:
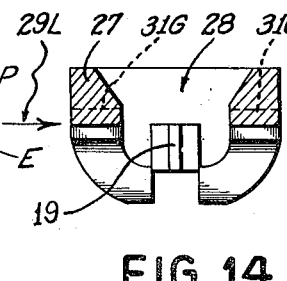

Fig. 14 is a cross sectional view, as developed along the plane or line pointed to at 14—14 in Fig. 4, showing the ring-like head of a conventional saw setting tool, with its two conventional depth gauge tooth rests, before the tool has become worn.

Figure 15:
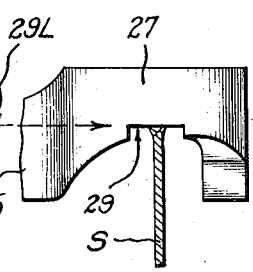

Fig. 15 shows a side elevation of a convention saw setting tool at rest on the sharpened points of the saw teeth and before the tool becomes worn.

Figure 16:
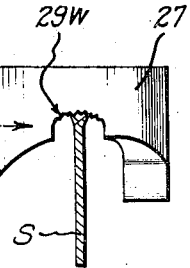

Fig. 16 is also a side elevation like the previous view but emphasizes the ultimate result of conventional practice and repeated use of the present-day saw set, with its worn or jagged tooth rest depth gauge surface damaged by the wearing action of the saw teeth resting thereagainst, and conversely the dulling action against the saw teeth points.

Referring further to the drawings, a conventional saw S has teeth T with points P and inside angular edges E forming a bottom apex or tooth crotch at C. The intersection of two or more teeth edges E define the crotch C at the mid-plane of the blade S. As well known, the distance or spread between the points P must be slightly greater than the thickness of the blade S in order to cut a path in which the blade may reciprocate without dragging. The alternate teeth T, therefore, are positively deflected outwardly in opposite directions from each other at an angle to the plane of the blade S, as known to the art, by a hand operated saw setting tool.

After a period of use, the saw becomes dull due not only to the gradual wearing of the tips of the points at P, with incidental loss of sharpness along that portion of the inside edges E near the points, as well as the outside edges near said points, but moreover becomes dull due largely to the gradual negative deflection or loss of the set angle originally imparted to the teeth. Thus the points P, due to sawing service, gradually bend and work back toward the plane of the saw blade until they no longer cut a path in which the saw blade S may freely run.

The reconditioning of the saw is then in order. First, the teeth T are filed (especially so if they are to be set with my new tool), thus restoring the points P, as well as the inner and the outer edges nearer the points. By preferably filing and sharpening the teeth first, they are put in order, as by bringing the teeth up to normal length, so that in thereafter setting the teeth they present uniformity of set or bend. A short tooth, say one which has struck a nail, will not properly set, but by first filing and restoring its length there follows a good setting job. Setting the teeth is for the purpose of restoring their angularity and spread of the points P to normal cutting position slightly wider apart than the thickness of the blade S. The extreme tips or points P constitute the line of advance or cutting attack of a saw through a board.

On the other hand, the crotch C of the teeth merely runs within the path opened by the points P and performs a minor cutting function, in consequence of which I have devised a setting tool with a crotch-type of tooth depth gauge which rests within the crotch C and thus between and below the points P. Any dulling tendency during the resetting operation with this new tool is minor and occurs at this minimum cutting area of the teeth. Therefore, the operator (when using this new tool) may proceed faster with the resetting operation, free of the care and attention which heretofore necessarily obtained, in the operation of a conventional saw set, if further dulling of the saw points was to be avoided.

Coming to the tool itself, there is shown a conventional saw setting tool comprising a frame body 15 which may terminate rearwardly in a downwardly directed handle 16 made integral and stationary on the frame body. An operating handle 17 may be pivoted at 18 in the frame and, in the usual way, has a ball-and-socket joint or other suitable motion-transmitting means operatively engaging the rear end of a tooth setting plunger 19 which reciprocates horizontally in the tool body. A spring 20 returns the operating handle 17 forwardly and the setting plunger 19 rearwardly to normal position, in a manner well known, after each hand operation of the tool. In this immediate description, a conventional saw set and its operating utility are first described.

A tooth setting anvil block 22 is movable up and down for vertical adjustment, in relation to the horizontal plunger 19, by a knurled screw 23 in order to adjust the plunger and anvil overlap to accommodate the tool to a particular saw, that is, to adjust the tool to the length of the teeth of the saw to be set. The anvil is then anchored in its adjusted position by a lock screw 24. A saw guide 25 with a vertical face of standard design is carried by the frame in spaced relation from the nose line 22 of the anvil. The saw S to be set is held vertically in a saw vise, as well known, with its teeth T uppermost. The tool 15 then is placed down upon the saw blade and, in conventional practice (Figs. 15 and 16), rests upon the teeth points P, the blade S being disposed between and having its two surfaces at rest against the flat vertical face of the guide 25 and nose edge 22 of the anvil (Figs. 1 and 4).

Thus the nose line of the anvil 22 and the adjacent face of the saw guide 25 are spaced apart a distance about equal to the thickness of the saw blade S. In some tools, the guide 25 is adjustable to the thickness of a saw blade. The adjacent operating or resetting faces of the plunger 19 and anvil block 22 are parallel, as well known in the art, for the purpose of deflecting or resetting every other saw tooth T at an angle to the plane of the saw blade S. Accordingly, the parallel adjacent faces of the plunger and anvil are formed to impart a predetermined angle of off-set to the teeth.

The frame body 15 includes a ring-like head 27 formed integrally or carried therewith, the adjustable anvil 22 being mounted in the forward portion of the frame head 27, while the resetting end of the plunger 19 reciprocates within the body and into an open sight view of the head and toward the anvil. By observing Figs. 4 and 14, this conventional type of ring-like open frame 27, with its sight view or sight opening space 28, is seen to provide a clear view to the operator when he is standing above the tool and looking downwardly through the hollow head and onto the upstanding teeth of the saw.

The ring-like or open head 27 provides two sides adapted to rest on the saw teeth points P with wearing and dulling effect. The two spaced sides are designated at 29 (note Fig. 14) which may be called the tooth rest or depth gauge surface of the tool. Thus a conventional tool has its two spaced horizontal frame surfaces 29 finished and predetermined in exact coincidence with the horizontal plane of the top edge of the tooth setting plunger 19 in order that the plunger may correctly register with a tooth T to be reset. This relationship is shown (Figs. 14 and 15) by a dotted arrow line 29L defining the plane coincident with the depth gauge 29 and upper surface of the plunger, assuming said arrow line as the plunger 19.

The horizontal width of the conventional depth gauge surfaces 29 is determined by the thickness of the stock or metal at the sides of the tool head 27 and, in conventional tools, is wide enough to bridge and rest on several teeth at a time for the purpose of distributing the pressure over several teeth and lessening the dulling pressure against any one of the tips or points P thereof. The constant placement and sliding adjustment of the tool head 27 along the saw blade S from tooth to tooth results in wearing away the tooth rest gauge surfaces 29, with resultant dulling of the teeth points P, so that in time such surfaces may gradually assume the jagged and eroded condition pointed to at the worn surface 29W (Fig. 16) which by increment and long use cuts away the coincident plane 29L previously mentioned as the upper line of plunger action.

When this wear 29W has eroded the original surfaces 29, the tool head 27 then rests irregularly on this jagged area and deeper down on the saw blade S. The result is that the tool no longer seats evenly but reaches deeper onto the teeth T. This condition causes the anvil 22 and setting plunger 19 to take a correspondingly deeper bite on each tooth, even beyond the bottom thereof and into the saw blade S. And this tends to crimp the blade or indent it beyond the tooth in a manner not intended for the saw and also outside the purpose of the resetting tool. Since a tooth will not bend or set except from its base outwardly, the increased depth or bite of the plunger places undue strain on the tool and needless pressure on the saw blade.

The foregoing results in malpositioning of the tool on the saw teeth and error in depth of offset imparted to the points P, to say the least of the dulling effect to which the points are subjected in their abrading action eroding the depth gauge surfaces as demonstrated at the wear area 29W. Skillful readjustment of the anvil 22 is not a solution, since the surface 29W has become pitted by tooth wear and has lost its original depth gauging characteristic.

The dotted arrow line 29L locates the plane of the original depth gauge surfaces 29 in Figs. 14 and 15, brings or sights the teeth points P of the saw S (Fig. 13) into alignment therewith, and finally sights to the non-existent depth gauge surface (Fig. 16), that is, indicates its original position prior to being worn away at 29W as may occur in old tools continued in use long after they have lost their original resetting accuracy. The area 29, constituting the tooth rest or depth gauge on either side of the view opening 28 through the tool head, is not hardened in standard tools on the market.

My invention herein, next explained, utilizes all the features of the foregoing standard tool, without altering the relationship of the old depth gauge 29 in its exact alignment with the top surface of the plunger 19, and introduces new means in place of the old gauging surfaces 29 to prevent the tool wear indicated at 29W (Fig. 16), now accomplished by eliminating all contact of the tips of the saw points P with the tool.

Coming to the description of the features of invention (Figs. 1 thru 12), it is noted that several examples are presented, as before mentioned. In Fig. 5, the tool head 27 is grooved at 31 across each of the old tooth gauge surfaces 29 on both sides of the view opening 28. This is further shown (Fig. 14) where the dotted lines 31G locate the position of the groove 31 to be formed in each side of the conventional tool head 27. Thus two horizontally aligned grooves 31 are provided in the head transversely of the plunger 19 and in the vertical plane assumed by the saw S, when the tool is placed thereon.

A hardened insert 32 (Fig. 6) is provided in pairs, one for each groove 31. The length thereof may well be equal to that of the grooves 31 and hence the thickness of the ring-like head 27 at the plane of the saw blade S. The thickness of this small member 32 may be comparable to that of a saw blade, more or less, although I make it thicker than some saw blades. I have made and successfully used such part $\frac{1}{16}''$ thick by $\frac{1}{8}''$ deep and $\frac{3}{8}''$ long. Such part or frame insert includes a pointed portion, more particularly being linearly or longitudinally ridged at 33 to form a V-shape, with an angle somewhat less than the inside crotch angle C of the saw teeth formed by the inner edges E thereof, in order to confine the ridge 33 to the crotch of the teeth and positively prevent said ridge from resting along said inner edges E. This V-ridge member 32 may be made of hardened steel or other suitable material, or its longitudinal apex portion 33 necessarily must be hardened to positively resist wear when riding or resting in the crotch C of the saw blade.

The ridged portion 33 is finished smooth, thereby adapting it to engage with minimum friction within the tooth apex or crotch C. The V-ridge or apex 33 is rounded off at 34 on each end to facilitate its sliding movement during the saw setting operation. The pair of members 32 is designed as a new tooth depth gauge to take the place of the flat surface conventional depth gauges 29 (Figs. 14 thru 16) and thus prevent the wear indicated at 29W. This small part or member 32, having the characteristics explained, is presented as a new element in this tool art, serving its purposes and performing the results herein by a new mode of operation.

The two V-ridge tooth gauges 32 are fitted into the frame grooves 31 with their longitudinal apexes 33 pointing downwardly coincident with the plane of the saw blade S, one at either side of the view opening 28 formed through the tool head. The parts 32 may be anchored in position within the grooves 31 by making a pressure-fit or by welding or otherwise securing same therein. The two apex ridges 33 are in exact alignment and, when resting within the crotch C of the saw teeth, locate the setting plunger 19 in exact setting registry with the saw points P, in the same relation as heretofore explained (Fig. 15) for the conventional tool. These depth gauge members 32 maintain the teeth points P out of wearing and dulling contact with and in spaced relation from the frame of the tool.

The foregoing features are further illustrated (Fig. 8) to show how the groove or grooves 31 may be chamfered at 35 along the parallel edges defining said groove, thereby rounding over the groove edges adjacent and on both sides of the longitudinal apex 33 in order to increase the spaced clearance relation between the saw teeth points P and the frame of the tool in this first form (Figs. 1 thru 8) of the invention. The gauge insert 32 is set deep into the frame, with the apex sides disposed within the chamfered edges 35 of the two grooves. The chamfer also facilitates fitting the gauge inserts 32 into the frame in the course of manufacture and assembly of the tool when it employs initially separate insert parts, instead of an integral formation later described.

Figure 9:
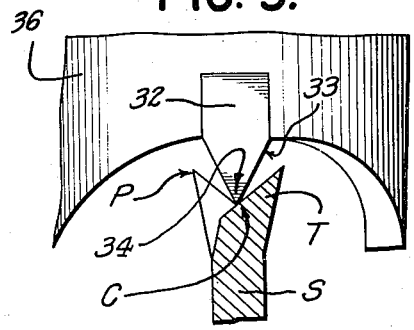
Fig. 9 is also an end elevation of the tooth rest or depth gauge disposed longitudinally along and between the saw teeth points, the entire portion of the apex of the tooth rest being exposed below the frame of the tool, as a second form of construction.

Fig. 9 shows a second form of construction with a frame head 36 of the tool cut away and redesigned to eliminate the chamfer 35 (Fig. 8) in order to fully expose the entire apex portion 33 of the gauge insert. This is also a satisfactory form in combining the pair of steel inserts with the tool frame. This arrangement also causes the depth gauge ridge 33 to support the tool above and in adequate spaced relation from the points P of the teeth.

Then in Fig. 10, there is a third form of construction further illustrating these principles. A tool frame or head 38 includes an integral apex tooth gauge, one on each side of the view opening 28 through the tool frame, in the form of a V-ridge rest or gauge 39 to support and maintain the tool frame in spaced relation from the saw teeth T when the tool is placed down upon the blade. This pair of integral tooth gauges 39 is hardened or at least surface-hardened and polished, and it performs the same purposes as heretofore explained. Indeed, there remains no reason why the entire frame or any portion thereof may not be hardened, inasmuch as this new tool does not rest upon the saw teeth points.

Figs. 11 and 12 illustrate the relationship of the anvil block 22, the setting plunger 19, and my new tooth depth gauge apex support adapted to seat against the crotch C of the saw teeth. This relationship could be illustrated with any form of the invention, but Fig. 10 with the integral apex tooth rest is chosen for this explanation. It will be observed that the new tooth gauge 39 positions the tool head 38 in such relation that the upper line or edge of the plunger 19 is in alignment (Fig. 11) with the tooth point P about to be off-set, in the same manner as heretofore explained for both the conventional tooth depth gauge surface 29 and my new crotch-type tooth rest herein. Thus the upper edge of the plunger 19 is located slightly above the apex of my new tooth depth gauge in any and all forms of its construction.

In Fig. 12, the shape and form of the new saw set depth gauge is shown in further modified or fourth form, whether of integral or separate insert type. A tool head 40 carries a rib or ridged depth gauge 41, the apex or extreme lower edge of which may be finished with a thinly formed oval linear seat or ridge 42. This finish is attained by grinding or honing off the linear ridge 42 to form a polished oval edge for the entire length of both ribs 41, one on each side of the view opening 28, as previously explained. If desired, the longitudinal sides of the depth gauges, in any equivalent form, may be curved inwardly, as suggested at 43, to increase its clearance from the inner edges E of the saw teeth T.

In the several illustrated examples of the invention, it will now be seen that my new tool frame is provided with a non-dulling and non-wearing rest means for engagement with the saw blade, whereof the weight of the tool and its contacting action against the teeth during the resetting operation is applied to a portion of the saw blade other than on the points P of its teeth. Thus is maintained the spaced clearance relation between the teeth points and the tool, with the result that the points retain their trim sharpness and the tool its uniform depth gauge characteristic by which to insure that the resetting plunger and anvil block overlap and take the same depth of bite at all times on all teeth being set.

This invention is presented to fill a need for a useful saw setting tool. It is understood how various modifications in construction, mode of operation, use and method, may and often do occur to others, especially so after they have benefitted from the teachings of an invention. Accordingly, this disclosure is exemplary of the principles and equivalents without being limited to the present showing of the invention.

I claim:

1. A saw tooth depth gauge, comprising a member having a lengthwise ridge which, in cross section, is in the form of an apex, formed of hard material, adapted to be carried by the frame of a saw setting tool, for longitudinal engagement between the teeth points of a saw blade, to support the frame of the tool in spaced relation from said points.

2. A saw tooth depth gauge means, comprising a pair of members, each of which has a lengthwise ridge which, in cross section, is in the form of an apex, adapted to be carried by the frame of a saw setting tool of the type having a ring-like head provided with a sight opening through which the saw teeth are observed, one member on each side of the sight opening, for longitudinal engagement between the points of the teeth of the saw blade, to support the frame of the tool in spaced relation from said points.

3. A saw tooth depth gauge as described in claim 2, wherein the pair of members are made of hard material for resisting wear when moving along and in engagement with the teeth between the points thereof.

4. In a saw setting tool having a frame, with a plunger coacting against an anvil, between which the teeth of a saw are adapted to be positioned for off-setting the points of said teeth; and means to support the frame of the tool in spaced relation from the points of the saw teeth, comprising a V-ridged formation of hardened material carried by the frame adapted to rest down in between the points of the teeth.

5. In a saw setting tool having a frame, with a plunger coacting against an anvil, between which the teeth of a saw are adapted to be positioned for off-setting the points of said teeth; and means comprising a hardened V-shaped ridge, with downwardly directed apex, adapted to seat within the crotch of the saw teeth to maintain the tool frame in spaced relation from the points of the teeth.

6. In a saw setting tool having a frame, with a plunger coacting against an anvil, between which the teeth of a saw are adapted to be positioned for off-setting the points of said teeth; and means to support the frame of the tool in spaced relation from the points of the saw teeth, comprising a ridged formation of hard metal, carried by the frame, having a downwardly directed linear apex, adapted to seat within the crotch of the saw teeth, and the linear apex being disposed below the upper edge of the plunger, whereby the points of the saw teeth extend upwardly beyond the linear apex for registry with the plunger.

7. In a saw setting tool having a frame, with a plunger coacting against an anvil, between which the teeth of a saw are adapted to be positioned for off-setting the points of said teeth; and means to support the frame of the tool in spaced relation from the points of the saw teeth, comprising a groove provided in the frame, and a member of hard material anchored in the groove having a downwardly directed apex ridge adapted to seat against the saw teeth between and below the points thereof.

8. The tool specified in claim 7, but having a further feature comprising chamfered edges defining the groove, thus providing clearance along both sides of the member between the frame and teeth points, with the angular sides of the member forming the apex sides extending into the chamfered groove.

9. In a saw setting tool having a frame, with a plunger coacting against an anvil, between which the teeth of a saw are adapted to be positioned for off-setting the points of said teeth; and means to support the frame of the tool in spaced relation from the points of the saw teeth, comprising a groove formed in the frame, a metal member filling the groove, with a hardened apex ridge formed on the member, the angular sides of the apex extending outwardly from the surface of the frame, thus exposing the apex ridge in its entirety outside the groove, and the hardened apex ridge being adapted to seat within the crotch of the saw teeth.

10. A saw setting tool having a plunger and anvil block operatively carried in a frame for resetting the teeth of a saw blade, and a V-ridged formation integrally carried by the frame in the plane assumed by the saw blade when the tool is placed in position thereon, the apex line of the ridge adapted to seat against the saw teeth, between and below the points of said teeth, for supporting the tool frame above the points of the saw teeth.

11. The tool specified in claim 10, characterized by making the V-ridged formation of hardened material to resist wear.

12. The tool specified in claim 10, wherein the apex of the V-ridged formation is formed of hard material and is finished and polished in oval form by rounding off the apex line.

13. In a saw setting tool having a frame, with a plunger coacting against an anvil, between which the teeth of a saw are adapted to be positioned for off-setting the points of said teeth; and means to support the frame of the tool in spaced-clearance relation from the points of the saw teeth, to prevent wear of the frame and dulling of the saw teeth, comprising a ridged formation of hard metal, carried by the frame, having a linear apex extending outwardly from the surface of the frame, the angle of which is less than the crotch angle of the saw teeth being set, adapted to seat down within the crotch of the saw teeth, and the linear apex being disposed below the upper edge of the plunger, whereby the points of the saw teeth extend beyond the linear apex toward the frame for registry with the plunger.

EDWARD OGLE.